June 4, 1940.                H. J. HARTLEY                 2,203,434
      STEAM AND SEDIMENT TRAP FOR A PRESSURE RESPONSIVE INSTRUMENT
                         Filed April 10, 1934
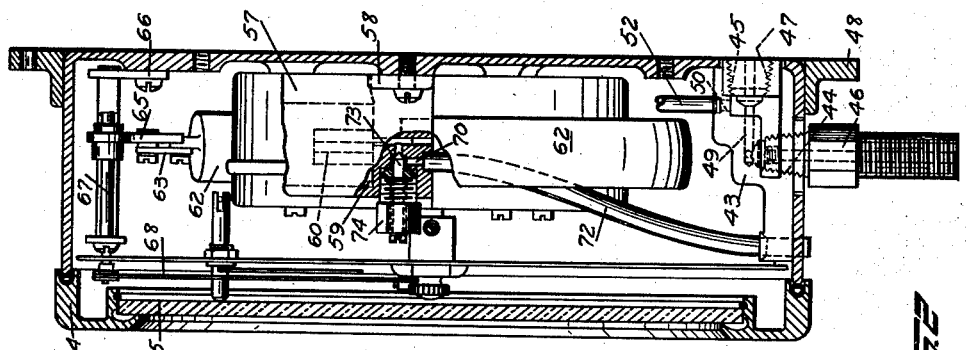
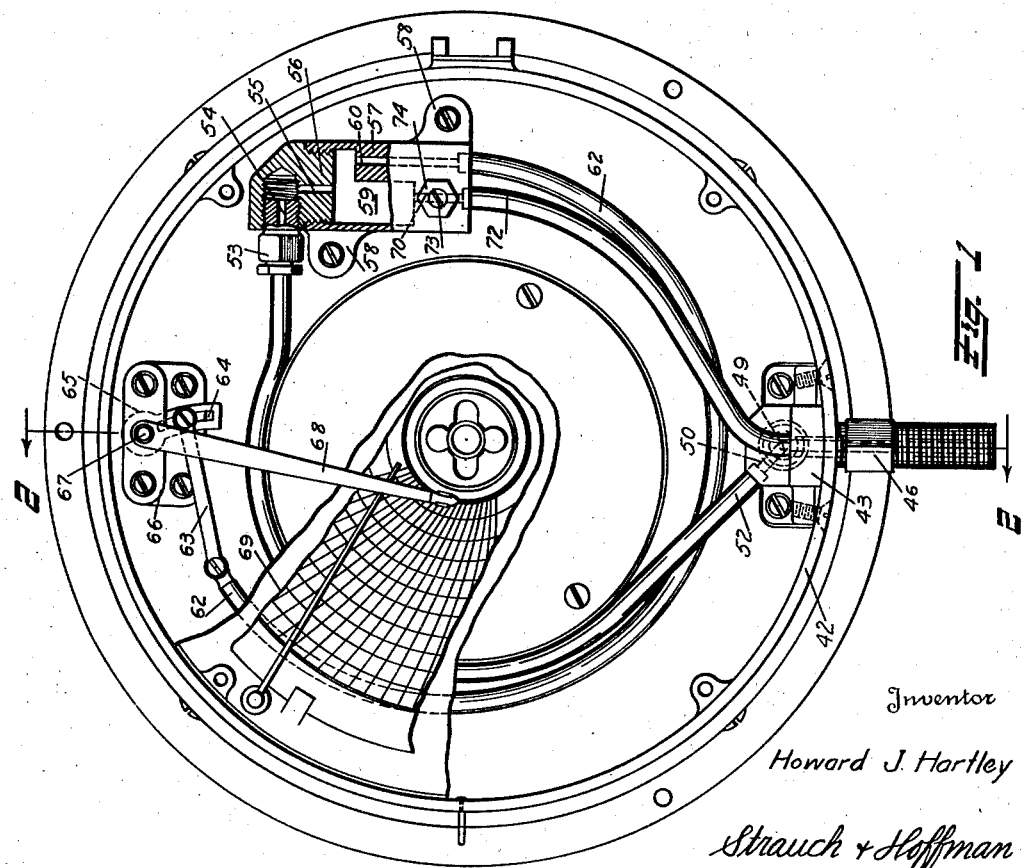
Inventor
Howard J. Hartley
Strauch + Hoffman
Attorneys Patented June 4, 1940

2,203,434

UNITED STATES PATENT OFFICE 2,203,434

STEAM AND SEDIMENT TRAP FOR A PRESSURE RESPONSIVE INSTRUMENT

Howard J. Hartley, Lansdale, Pa., assignor to United States Gauge Company, New York, N. Y., a corporation of Pennsylvania Application April 10, 1934, Serial No. 719,974

8 Claims. (Cl. 73—109)

This invention relates to pressure responsive instruments of the type wherein it is necessary or desirable to employ means for preventing the internal parts, particularly the materials of the responsive element and of any fusible joints, from being subjected to excessively high temperatures.

An example of this type of instrument is a steam gauge embodying a conventional "pigtail siphon" consisting of a looped condensate trap in the pressure line between the fluid source and the socket which carries the pressure responsive element. In such a gauge the siphon is disposed externally of the gauge case and hence not only detracts from its appearance but also is in a position where it may suffer damage. For these reasons and others that follow, the present invention contemplates a concealed and protected siphon for use in gauges which are connected to hot vapors.

It has previously been proposed to mount a protecting siphon pipe within the instrument casing as illustrated in Patent Number 534,007, granted February 12, 1895, but that proposed arrangement is open to a number of objections. The siphon pipe is so shaped and is related to the steam inlet and pressure responsive element in such manner, that the Bourdon tube will usually be partly filled with live steam and that hot condensate will fill the remainder of the tube. The live steam is always too hot and the condensate frequently and readily attains an undesirably high temperature. An even greater disadvantage of the proposed arrangement is that several separate fittings and mountings are required. This results in expensive manufacture, improper correlation of parts and difficulty in making repairs and adjustments.

It is the primary object of the present invention to devise a novel internal condensate and sediment trap assembly. More specifically, it is an object to mount a condensate and sediment trap assembly and a Bourdon tube as an improved combined unit within a gauge casing, the trap constituting the supporting member and designed for connection to the gauge casing.

Another major object of this invention resides in the provision of a novel condensate trap assembly which, though internally disposed, will effectively prevent the internal gauge structure from being subjected to damaging temperatures.

Another object is to provide a novel unitary gauge construction comprising a condensate and sediment trap; a Bourdon tube; and a post adapted for connection to a source of pressure; and to so design the parts that they may be assembled as a unit and tested prior to mounting them in the gauge casing.

Another object of the present invention resides in the provision of a combined condensate and sediment trap for use on a pressure gauge, the trap preferably being provided with means for conveniently "blowing" or cleaning it.

The above and additional objects will fully appear from a study of the following detailed description and the appended claims when taken in conjunction with the accompanying drawing wherein:

Figure 1 is a face view, in partial section and with the cover removed, of a recording instrument embodying the present invention.

Figure 2 is a vertical sectional view substantially on the plane indicated by line 2—2 in Figure 1.

With continued reference to the drawings, wherein like reference characters have been employed to designate like parts throughout the several views thereof, my invention has been illustrated as being embodied in a recording instrument but it is not limited to such use as it may be advantageously employed in various types of compressing gauges. The instrument shown comprises a casing 42 which has an internal socket member 43 secured in conventional manner to the bottom of the cylindrical casing wall. The socket member 43 has a downwardly opening threaded socket 44 and a backwardly opening threaded socket 45, either of which is adapted to receive either a special coupling 46 for supplying fluid under pressure to the instrument, or a closure plug 47. This gives a choice of two inlet openings, selection of which will depend upon the manner in which the casing is mounted. In the illustrated form the casing is designed to be mounted flush with a wall or the like by means of a flange member 48 which encircles the casing, and hence the socket 45 is closed by the plug 47 and a special type of plug or opening 46 is screwed into the socket 44.

The passageway 50 enters the upper surface of the socket member 43 and is in communication with both of the bores 44 and 45 by way of a horizontal passageway 49. Any entering vapor such as steam is conveyed upwardly through the passage 50 into one end of a small tubular pipe 52 which is anchored in the latter. This pipe 52 is of substantially semi-circular form, being arranged substantially concentrically relative to the casing, and has at its other end a coupling plug 53, provided with an axial through passage 54, for anchoring it in the cap 56 of a cup member 57. The cap 56 is screw-threaded into the cup member and has a vertical passage 55 establishing communication with the passageway 54 and the interior of the cup.

The cup 57 is shaped to provide an internal chamber 59 which operates as a condensate and sediment trap. The cup 57 preferably has ears 58 for anchoring it to the casing. A vertical passage 60 is provided in the body of the cup, one end of this passage being in communication with the upper end of the trap and the other end being designed for connection with one end of a Bourdon tube 62. The Bourdon tube is concentrically arranged within the cylindrical casing wall and is laterally offset with respect to the pipe 52 in order to clear the same. The closed free end of the Bourdon tube is pivotally connected to one end of a link 63, the opposite end of which is adjustably associated with a slot 64 in an arm 65 that is pivotally mounted on a bracket 66 by means of a pin 67. The pin 67 carries a pen 68 which is designed for recording cooperation with a chart 69.

The bottom of trap 59 opens into a discharge or drain passageway 70 which opens into a drain pipe 72 but which normally is tightly closed by a valve 73. The valve 73 has an externally threaded end designed to be conveniently actuated by a screw driver to open or close the passageway 70. The threaded end of the valve cooperates with a packing gland nut 74 which is screwed into the front wall of the cup, and which likewise is disposed for convenient adjustment to insure sealing of the valve against leakage. When the valve 73 is opened for the purpose of removing sediment from the trap, or for removing any excess condensate, the contents of the trap chamber will be discharged through the passageway 70 into the drain pipe 72 and thence into the atmosphere externally of the instrument casing. This external discharge is preferably brought about by projecting the lower end of the drain pipe 72 downwardly through the socket member 43 and the bottom of the cylindrical casing wall, as illustrated.

In operation of the instrument just described, hot vapors will pass through the tube 52 into the cup 57 and, the valve 73 being normally closed, condensate will form and fill the chamber 59. The condensate overflowing from the trap into the vertical passageway 60 will at least partially fill the Bourdon tube so that the open end of the latter always contains condensate and the tube is thus protected against excessively high temperatures. Any sediment will, of course, collect in the bottom of the trap chamber 59 and, as previously explained, can be readily removed by opening the valve 73 for a few seconds.

By connecting all of the parts to cup 57 and post 43, and providing the cup and post with clamping faces adapted to be pulled into tight engagement with the rear face of the gauge casing, the working parts of the gauge may be completely assembled and tested prior to mounting in the gauge casing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pressure responsive instrument comprising a cylindrical casing having an end wall, a post member secured to the inside of said casing adjacent the lower portion thereof, a hollow receptacle element secured to said end wall above the center of said casing, passage means in said post adapted to be connected to a source of fluid under pressure, a curved section of tubing secured to said post and to said receptacle element, said tubing being connected to said passage means at one end and communicating with the interior of said hollow receptacle element at the other end, a Bourdon tube secured to said element and extending downwardly therefrom, and passage means in said element connecting the upper portion of the interior thereof with said Bourdon tube, said last named passage means entering said receptacle element at a point offset from the point where said tubing enters said receptacle whereby heated fluid entering said receptacle may condense to a liquid therein prior to entering said Bourdon tube.

2. A pressure responsive instrument comprising, a casing having a cylindrical wall and an end wall, supporting means secured to said end wall above the lower portion of said casing, said supporting means being hollowed to form a chamber therein, a Bourdon tube secured to said supporting means and dependent therefrom, passage means in said supporting means placing said tube in fluid communication with the upper portion of said chamber, a post member secured to the lower part of said casing and provided with a passage adapted to be connected to a source of fluid under pressure, a curved section of tubing within said casing, said tubing being secured at one end to said post in communication with the passage means therein, and at the other to said supporting means, and passage means for connecting said tubing to the upper part of said chamber, at a point laterally offset from the main body of said chamber, and out of alignment with said first named passage means.

3. In a fluid pressure gauge, a casing; a hollow post secured to the lower portion of said casing and adapted for connection to a source of fluid pressure; a block-like member hollowed to provide a chamber mounted in the upper portion of said casing; said chamber having a deep portion and a shallow portion, a tube placing said post in fluid communication with the upper portion of said chamber; a Bourdon tube supported by said member and disposed in fluid communication with the upper portion of said chamber, and a third tube in fluid communication at its upper end with the deep portion of said chamber and secured at its lower end to said post, means for controlling fluid flow through said third tube, said third tube communicating with the exterior of said casing, whereby any sediment may be exhausted from said chamber and carried free of said casing.

4. In a fluid pressure gauge, a casing; a hollow block-like member mounted in the upper portion of said casing, said member providing on its interior a chamber having a deep portion and a shallow portion, a Bourdon tube connected to the bottom of said member and communicating with the shallow portion of said chamber; a tube connected to the upper portion of said member in communication with said chamber and adapted to have fluid pressure applied thereto; and a drain tube entering the bottom of said member in fluid communication with the deep portion of said chamber, for carrying away any sediment accumulated therein.

5. The gauge defined in claim 4, wherein said tube connected to the upper portion of said member discharges downwardly into the deep portion of said chamber offset from the shallow portion.

6. In a pressure responsive instrument having a casing and a Bourdon tube within said casing; means for conducting fluid under pressure to said Bourdon tube including a combined condensate and sediment trap comprising a hollow block-like member adapted to be mounted in said casing above the bottom thereof and having a deep portion and a shallow portion; a drainage tube for said trap means depending from the deep portion of said member and extending to the exterior of said casing and adapted to drain liquid and sediment from the bottommost portion of said chamber; and a valve in said block-like member for controlling the flow through said drainage tube, said valve being operable at will to blow out said sediment trap means when said chamber is under pressure.

7. A pressure responsive instrument comprising a generally cylindrical casing; a post secured to said casing adjacent the lower portion thereof; an enlarged receptacle-forming block within said casing above said post; a Bourdon tube disposed within said casing and having one end thereof rigidly secured to said block; means for rigidly securing said block to said casing; means in said post forming a passage adapted to be connected to a source of fluid under pressure; a conduit placing said passage in said post in fluid communication with the upper part of said receptacle-forming block; passage means in said block axially offset from the discharge end of said conduit placing the upper portion of said block in fluid communication with said Bourdon tube, whereby fluid entering said receptacle is condensed to a liquid and sediment is prevented from reaching said Bourdon tube, a second conduit connected to the lower portion of said block and in fluid communication with the interior thereof, for draining sediment therefrom, said second conduit extending to the exterior of said casing; and closure means for selectively placing the interior of said block in communication with the atmosphere by way of said second conduit or sealing it therefrom; said post having an opening therein for rigidly supporting the lower end of said second conduit.

8. A pressure responsive instrument comprising a generally cylindrical casing having an open front and a substantially flat back wall; a Bourdon tube and condensate trap assembly within said casing including, a Bourdon tube, a post member having a clamping face, separate trap means having a clamping face, means for securing said Bourdon tube to said trap means, and a section of tubing secured to both said post and said trap means; passage means in said post adapted to be connected to a source of fluid under pressure and communicating with one end of said tubing; passage means connecting another portion of said tubing to the upper portion of said trap means, whereby fluid under pressure is discharged thereinto and condensed therein; passage means connecting the upper portion of said trap means to said Bourdon tube at a point axially offset from said first-named passage means, and means for removably securing said post and said trap means, together with said tubing to the flat back wall of said casing, with the clamping faces of said post and trap means in frictional engagement with said back wall of said casing, whereby said assembly is capable of insertion as a pre-assembled unit into said casing.

HOWARD J. HARTLEY.